United States Patent [19]

Sable et al.

[11] Patent Number: 4,901,754
[45] Date of Patent: Feb. 20, 1990

[54] VALVE IMPROVEMENTS

[75] Inventors: Chester A. Sable, Rancho California; Lawrence V. Maldarelli, Tustin; Henry Church, Whittier; Roy Graboff, Granada Hills, all of Calif.

[73] Assignee: Anthony Industries, Inc., City of Commerce, Calif.

[21] Appl. No.: 346,135

[22] Filed: May 2, 1989

Related U.S. Application Data

[62] Division of Ser. No. 202,208, Jun. 3, 1988, which is a division of Ser. No. 919,890, Oct. 15, 1986, Pat. No. 4,778,595.

[51] Int. Cl.$^4$ .................... F16K 31/22; F16K 33/00; F16K 25/00
[52] U.S. Cl. .................... 137/433; 137/449; 137/516.29; 251/332; 251/333; 251/900
[58] Field of Search ............... 137/202, 429, 430, 433, 137/449, 516.25, 516.27, 516.29; 251/332, 333, 900

[56] References Cited

U.S. PATENT DOCUMENTS

| | | |
|---|---|---|
| 511,995 | 1/1894 | Buckley . |
| 540,760 | 6/1895 | Sawyer . |
| 757,873 | 4/1904 | Allen . |
| 924,641 | 6/1909 | Crispin . |
| 1,073,354 | 9/1913 | Lauterbach . |
| 1,294,002 | 2/1919 | Weatherhead . |
| 1,366,028 | 1/1921 | Schlag .................... 137/433 |
| 1,698,990 | 1/1929 | Derryberry . |
| 2,111,473 | 3/1938 | Hudson . |
| 2,347,092 | 4/1944 | Evans . |
| 2,358,228 | 9/1944 | Hoof .................... 251/900 |
| 2,476,434 | 7/1949 | Spang .................... 137/433 |
| 2,538,364 | 1/1951 | James et al. .................... 251/333 |
| 2,676,782 | 4/1954 | Bostock et al. .................... 137/516.29 |
| 2,738,803 | 3/1956 | Manning .................... 251/900 |
| 2,752,941 | 7/1956 | Mitchell .................... 251/333 |
| 2,764,172 | 9/1956 | Strayer . |
| 2,768,704 | 10/1956 | Cronkhite . |
| 2,909,186 | 10/1959 | Larson . |
| 2,912,000 | 11/1959 | Green .................... 137/516.29 |
| 2,935,990 | 5/1960 | Biddle .................... 137/202 |
| 3,152,604 | 10/1964 | Frye et al. .................... 251/333 |
| 3,200,839 | 8/1965 | Gallagher .................... 251/332 |
| 3,216,451 | 11/1965 | Smallpeice .................... 251/900 |
| 3,248,056 | 4/1966 | Obermaier .................... 251/332 |
| 3,396,974 | 8/1968 | Nord . |
| 3,401,751 | 9/1968 | Loftin et al. . |
| 3,586,032 | 6/1971 | Weinstein .................... 137/202 |
| 3,620,653 | 11/1971 | Gaylord et al. .................... 137/516.29 |
| 3,731,905 | 5/1973 | Piet .................... 251/333 |
| 3,736,950 | 6/1973 | Smallwood .................... 137/202 |
| 3,759,281 | 9/1973 | Falcuta .................... 137/433 |
| 3,786,829 | 1/1974 | Nardo et al. .................... 137/202 |
| 3,957,640 | 5/1976 | Stack . |
| 4,036,467 | 7/1977 | Dalton .................... 251/319 |
| 4,094,346 | 6/1978 | Milo .................... 137/202 |
| 4,230,142 | 10/1980 | Saarem et al. .................... 137/202 |
| 4,402,340 | 9/1983 | Lockwood, Jr. .................... 137/516.29 |
| 4,408,632 | 10/1983 | Kent .................... 137/516.29 |
| 4,457,325 | 7/1984 | Green .................... 137/202 |
| 4,562,852 | 1/1986 | Britt . |
| 4,574,048 | 3/1986 | van den Broek . |
| 4,606,365 | 8/1986 | Siposs .................... 137/433 |
| 4,640,304 | 2/1987 | Looney .................... 137/202 |

FOREIGN PATENT DOCUMENTS

| | | |
|---|---|---|
| 717860 | 9/1965 | Canada .................... 251/900 |
| 192758 | 12/1956 | Fed. Rep. of Germany .................... 137/516.29 |
| 1101081 | 3/1961 | Fed. Rep. of Germany .................... 137/516.29 |
| 2348209 | 4/1974 | Fed. Rep. of Germany . |
| 2800556 | 7/1979 | Fed. Rep. of Germany . |
| 1479517 | 3/1967 | France .................... 277/177 |
| 53836 | 11/1910 | Switzerland .................... 277/177 |
| 3875 | of 1896 | United Kingdom . |
| 966203 | 8/1964 | United Kingdom . |

OTHER PUBLICATIONS

The Johnson Corporation Bulletin VB-1001, "Vacuum Breakers", 6-12-84.
The Johnson Corporation, Private Communication including letter dated 1/3/85 and Drawing dated 6/23/82 pp. 6-25 and 6-26 of Parker Handbook.

*Primary Examiner*—George L. Walton
*Attorney, Agent, or Firm*—David Weiss

[57] ABSTRACT

Valve assemblies having a valve seat with a conical surface for causing an included O-ring to roll upon and wedge against the conical surface for closing the port when a spherical valve member is forced against the O-ring.

9 Claims, 5 Drawing Sheets

VALVE IMPROVEMENTS

CROSS-REFERENCE TO RELATED APPLICATIONS

This Application is a division of co-pending U.S. patent application Ser. No. 07/202,208, filed June 3, 1988, which is a division of U.S. patent application Ser. No. 06/919,890, now U.S. Pat. No. 4,778,595, issued Oct. 18, 1988. Reference is further made to related U.S. patent application Ser. No. 07/195,603, filed May 18, 1988.

BACKGROUND OF THE INVENTION

This invention relates to valve assemblies, and more particularly to valves having valve seats and/or valve members with conical surfaces which cause an included O-ring to roll upon and wedge between the valve member and the seat for reliably closing the valve. Such valves are particularly useful in an automatic air pressure relief and check valve assembly which, when used in combination with a swimming pool filter tank, permits air to be evacuated from the tank while the tank is being filled with water and automatically closes when the tank is full of water to prevent air from entering the tank and thereby preventing the water in the tank to drain to the swimming pool.

Most swimming pools include a water recirculation system where water from the pool is circulated through a filter and then returned to the pool. The filter generally comprises a water tank which contains a bed of granular filter material such as sand, or filter elements coated with diatomaceous earth, through which the pool water is forced for removing solid particles therefrom. The filtered water is then returned to the swimming pool. Water circulation is conventionally accomplished by means of an electrically driven water pump situated in the water line between the pool and the inlet side of the filter tank.

Proper maintenance of such filters requires that the tank be disassembled from time to time, for permitting maintenance of the sand bed and cleaning of the diatomaceous earth filter elements. Prior to tank disassembly, of course, the tank must be drained of water.

In the swimming pool filter systems of the prior art, a manual air relief valve is conventionally attached to the upper portion of the filter tank. The air relief valve is manually opened to permit air to enter the tank so that the tank may be drained prior to tank disassembly. After the filter has been maintained and the tank reassembled, the maintenance person must assure that the relief valve is open so that air will be permitted to escape from the tank while the tank is being filled with water. When the tank becomes full, the maintenance person must manually close the valve to prevent water from escaping therethrough and to permit recirculating water pressure to be established, as well as for precluding re-entry of air into the tank when the pump is periodically shut down.

SUMMARY OF THE INVENTION

When used in combination with a swimming pool filter tank, the valve assembly of the present invention automates the aforementioned critical valve functions during filter maintenance. The valve assembly includes a normally open lower valve which is responsive to the tank's being full of water for closing the lower valve, in combination with a normally closed upper valve which is responsive to air being expelled from the tank through the normally open lower valve for opening the upper valve during times when water is filling the tank. Associated with the normally closed upper valve is selectively actuable means for opening the normally closed upper valve during selected other times, such as when it is desired to permit air to enter the tank through the upper valve so that water may be drained from the tank prior to tank disassembly and filter maintenance.

The dual valve assembly of the present invention includes a valve body having a passageway communicating with the inside of the tank through a lower port, and communicating with the outside of the tank through an upper port. The lower valve includes a buoyant valve member, a valve seat about the lower port and adapted for seating engagement with the valve member to close the lower port, and means normally supporting the valve member and for guiding the valve member to float into seating engagement with the valve seat when the tank becomes full of water. The upper valve includes a valve member, and a valve seat about the upper port adapted for seating engagement with the valve member for closing the upper port. The valve member is normally in seating engagement with the valve seat and is unseated therefrom when air is forced through the passageway from the tank when water is filling the tank. The selectively actuable means associated with the upper valve permits the upper valve member to be unseated from the valve seat for admitting air into the tank.

In the preferred embodiment of the valve assembly according to the present invention, the valve member of the lower valve has a spherical surface and is preferably a sphere, although a cylindrical member having at least one hemispherical end may be alternatively employed. A unique valve seat of the lower valve includes an annular channel in the valve body about the lower port, and an O-ring situated in the channel and having an inside diameter smaller than the diameter of the spherical valve member. The annular channel is inclined such that a wall thereof has an upwardly and inwardly extending conical surface about the passageway vertical axis. The O-ring remains in contact with the conical wall for sealing the lower port when the spherical valve member is forced against the O-ring, the valve seat operating as a rolling wedge which increases the sealing force of the valve member in its seat at otherwise low sealing pressures.

The preferred embodiment of the upper valve includes a novel plunger-type valve member having a bottom portion for being received by the passageway to close the upper port. The passageway of the valve body has an interior upwardly and outwardly extending conical surface about the passageway vertical axis, and the plunger bottom portion has an exterior upwardly extending conical surface about the same axis. An O-ring is carried by the plunger bottom portion with its inner circumference in contact with the plunger conical surface, the outer surface of the O-ring being in contact with the passageway conical surface when the plunger bottom portion is received by the passageway such that the O-ring is disposed within an annular space between the conical surfaces. When the plunger is coerced downwardly, as in response to a vacuum within the tank, the conical surfaces cause the O-ring to squeeze and roll upon itself, resulting in a tight seal. The upper portion of the plunger member is accessible for manually coercing the plunger from its seated condition, for opening the upper valve when desired.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of the invention is illustrated by way of example, and wherein like reference numerals are utilized to indicate like components. It is to be expressly understood, however, that the drawings are for the purpose of illustration and description only, and are not intended as a definition of the limits of the invention.

DESCRIPTION OF THE PREFERRED EMBODIMENT

Figure 1:
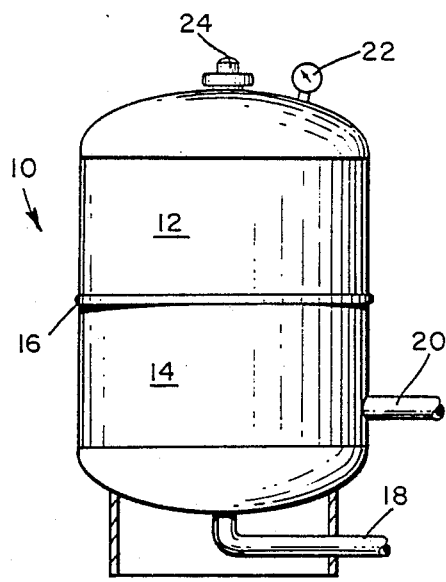
FIG. 1 is an elevation view of a swimming pool filter tank, shown with the valve assembly of the present invention in place.

Turning to FIG. 1, a conventional swimming pool filter tank 10 may include a top section or cover 12 and a bottom section 14, held together in sealing engagement at their respective flanges 16. The tank 10 includes a water inlet 18, for normally receiving water from a swimming pool by means of a pump (not shown) to fill the tank 10, where the water is filtered through filters (not shown) within the tank 10 and then returned to the pool through a water outlet 20. During filtering, pressure of the water in the tank may be indicated by such means as a pressure gage 22 communicating with the inside of the tank 10.

During an initial filling of the tank 10, which may occur after the filter material or elements have been installed within the tank 10 following cleaning, water entering the tank 10 through the water inlet 18 must fill the tank 10 in order that sufficient water pressure may be established for recirculation through the outlet 20 to the swimming pool, and from the pool to the tank 10 through the inlet 18. Water filling the tank 10 displaces the air within the tank 10, and the displaced air exits the tank 10 through the valve assembly 24 of the present invention which is attached to the upper portion of the tank 10. When all of the air is evacuated and the tank 10 becomes full of water, the valve assembly 24 automatically closes, preventing the water from leaving the tank 10 through the valve assembly 24 and permitting recirculation to occur while the pump is operating. The valve assembly 24 then prevents the admission of ambient air into the tank 10 through the valve assembly 24, so that the pump's being turned off will not cause the water within tank 10 to drain into the pool unless one desires draining to occur. The features of the valve assembly 24 which permit such operation are hereinafter described.

Figure 2:
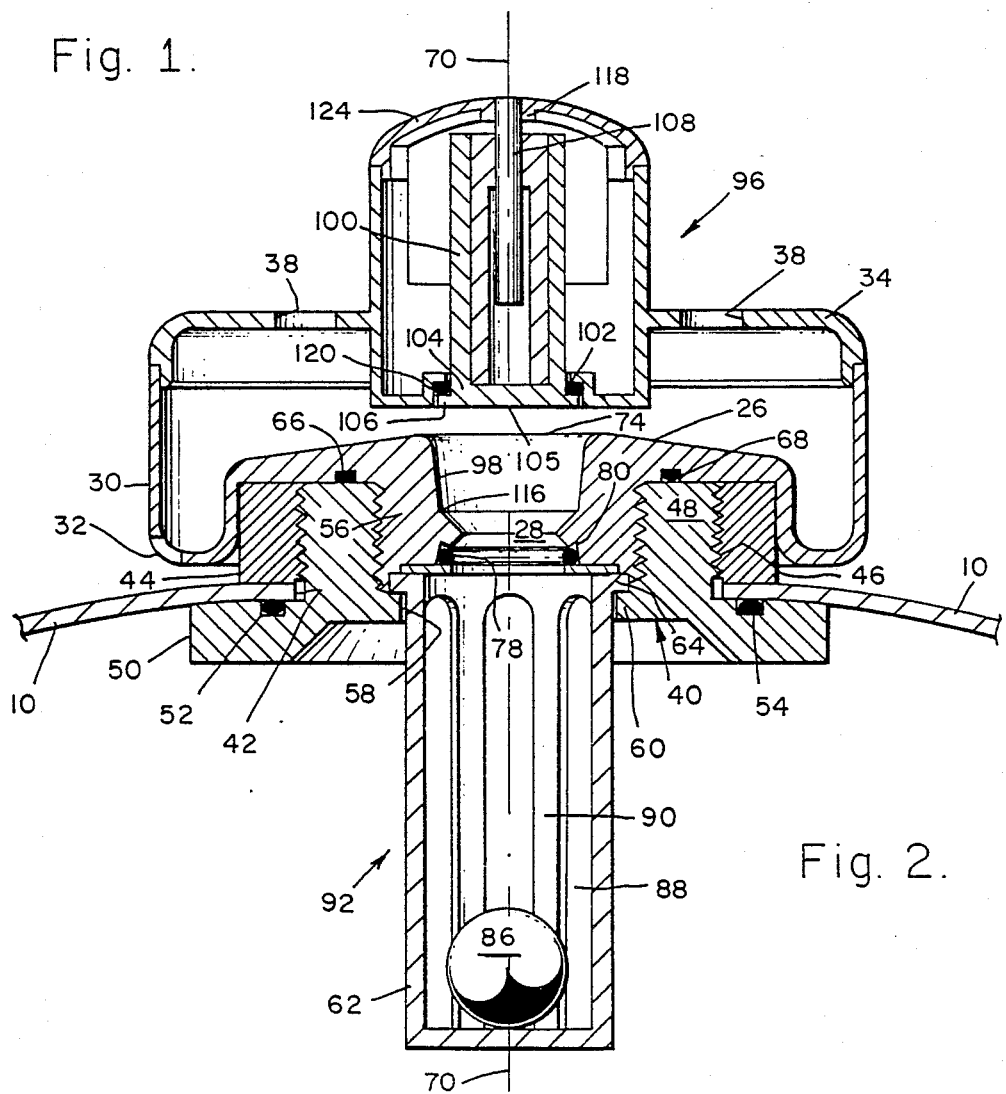
FIG. 2 is a front elevation cross-sectional view of a preferred embodiment of the valve assembly of the present invention, attached to the filter tank, indicating operation of the valve assembly when water is filling the tank.

Turning next to FIG. 2, the preferred embodiment of the valve assembly 24 includes a circular valve body 26 (shown enlarged in FIG. 3) coupled to the tank 10 such that a passageway 28 through the valve body 26 communicates with the inside and outside of the tank 10. The preferred valve body 26 is configured to include a water catch basin 30 with a drain hole 32, the purpose of which will be explained later. A cover 34 is removably attached to the basin 30, for example by screw fastening means 36 shown in FIG. 8. The cover 34 includes apertures 38 for facilitating the entry or exhaust of air into or from the tank 10 during operation of the valve assembly 24 when the passageway 28 is open as shown in FIG. 2.

In the embodiment shown in FIG. 2, the valve assembly 24 is coupled to the upper portion of the tank 10 through the use of a mounting ring 40 having an annular shoulder 48 projecting through a circular aperture 42 at the top of the tank 10, and is retained by means of a nut 44 threadedly engaging corresponding external threads 46 of the mounting ring shoulder 48 and bearing against the top walls of the tank 10 about the circular aperture 42. A lower portion 50 of the mounting ring 40 includes an annular groove 52 containing an O-ring 54 such that the upper surface of the lower mounting ring portion 50 is secured against the inner wall surface of the tank 10 with the O-ring 54 forming a seal about the circular aperture 42 when the retaining ring 44 is tightened against the exterior surface of the tank 10. The valve body 26 is secured within a central aperture 58 of mounting ring 40, by means of valve body circumferential threads 56 engaged with corresponding internal threads of the shoulder 48.

The lower portion of the mounting ring 40 is configured, about its central aperture 58, to include an annular shelf 60 onto which is mounted a basket 62 by means of an annular ledge 64 engaging a mating lower surface of the valve body 26. A water-tight seal between the valve body 26 and the mounting ring 40 is provided by an O-ring 66 situated in a downwardly facing annular channel 68 of the valve body 26 in contact with the upwardly facing surface of the annular shoulder 48 of the mounting ring 40.

Figure 3:
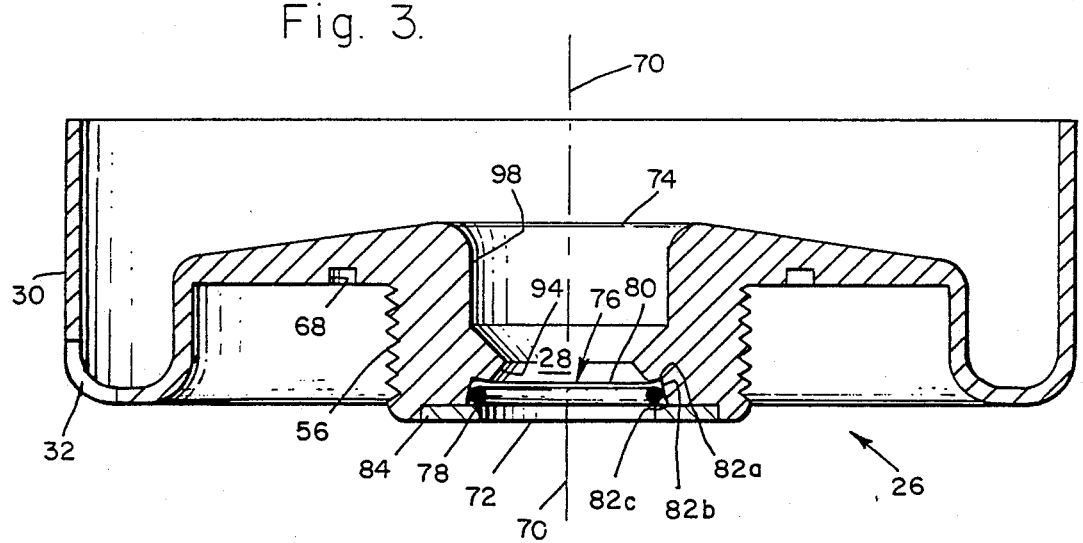
FIG. 3 is a front elevation cross-sectional view of the body portion of the valve assembly of the present invention enlarged for clarity.

When the valve assembly 24 is installed at the upper portion of the tank 10, the passageway 28 is oriented about a vertical axis 70 with the passageway's lower circular opening or port 72 (see also FIG. 3) communicating with the inside of the tank 10 and its upper opening or port 74 communicating with the outside of the tank 10 through the cover apertures 38. As best shown in FIG. 3, a lower valve seat 76 is formed about the lower port 72 of the passageway 28, by means of a lower valve O-ring 78 situated in a lower valve seat channel 80. The lower channel 80 is inclined upwardly and inwardly toward the vertical axis 70, the purpose of which will be explained later. The channel 80 is defined by two components, i.e. a first component describing two adjacent walls 82a, 82b within the valve body 26 and a second component describing a third wall 82c formed by a flat ring 84 affixed to the lower end of the valve body 26. Such a two-piece structure permits the valve body 26 to be molded rather than machined while the channel 80 may be configured as shown, allowing the O-ring 78 freedom of movement while being retained at the lower port 72 of the passageway 28.

Returning to FIG. 2, situated below the lower valve seat 76 is a lower spherical valve member or ball 86 normally supported within the basket 62. The basket support 62 includes a plurality of slots 88 for permitting water to be admitted into the basket 62 when the tank 10 becomes filled with water while preventing admission to the valve assembly 24 of solid matter of substantial size. In the embodiment shown in FIG. 2, the vertical wall material between the slots 88 provide guide surfaces 90 for vertically guiding the ball 86 when it is lifted from its normal position at the bottom of the basket 62.

The spherical valve member 86 is buoyant, having a specific gravity less than that of water, and may be made of such material as polypropylene.

Figure 4:
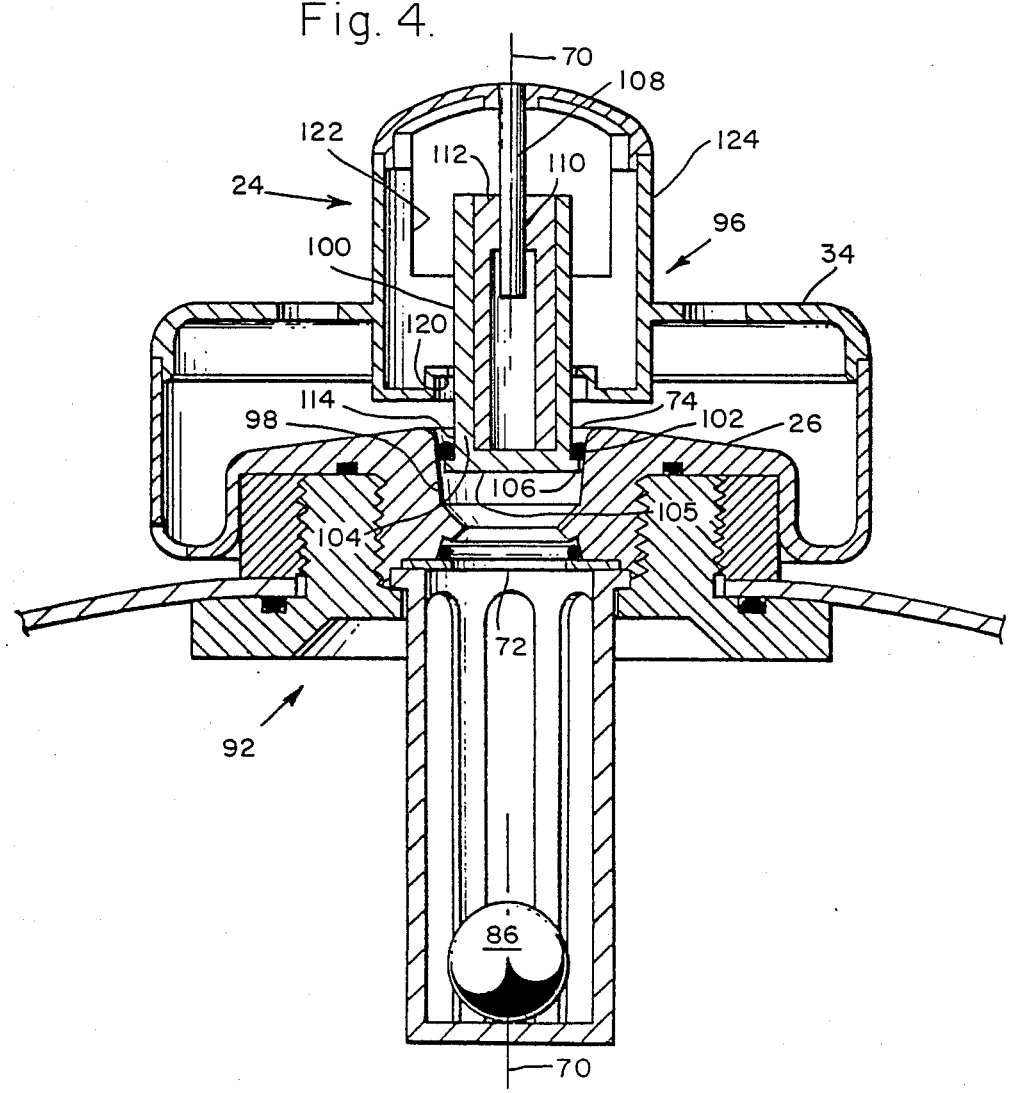
FIG. 4 is a view similar to FIG. 2, indicating the normal configuration of the valve assembly.
Figure 8:
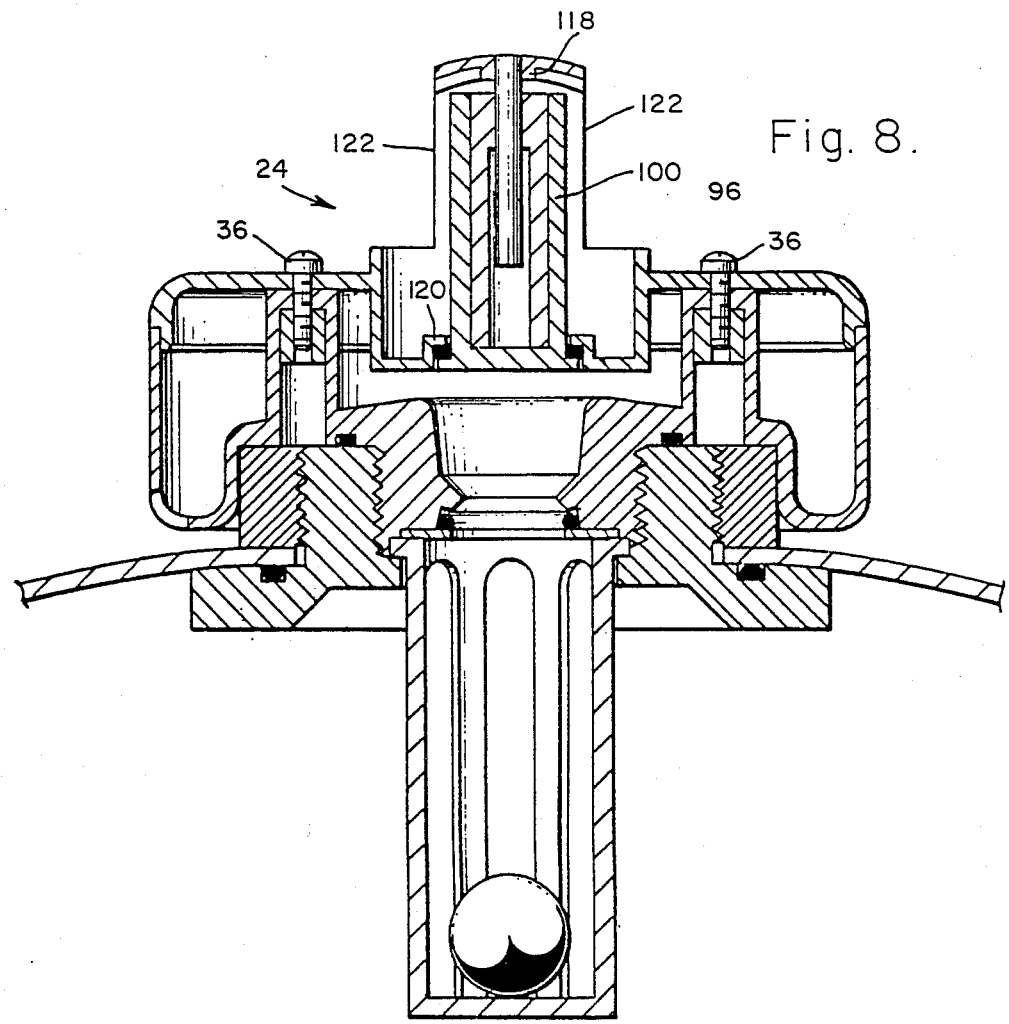
FIG. 8 is a side elevation cross-sectional view of the valve assembly of FIG. 2, indicating a feature of the valve assembly which permits air to enter the tank when actuated.

The combination of the buoyant ball 86, the lower valve seat 76 and the basket support 62 comprises a first or lower valve 92 which is normally in an open condition as shown in FIGS. 2, 4 and 8. When water has filled the tank 10, as shown in FIG. 5, the water entering the basket 62 causes the buoyant ball 86 to float within the basket 62 until it engages the lower valve O-ring 78 Since the inside diameter of the O-ring 78 is smaller than the diameter of the ball 86, the seating of the ball 86 in the O-ring seat 76 closes the first valve 92 against water escaping from the tank 10 through the passageway 28

Figure 5:
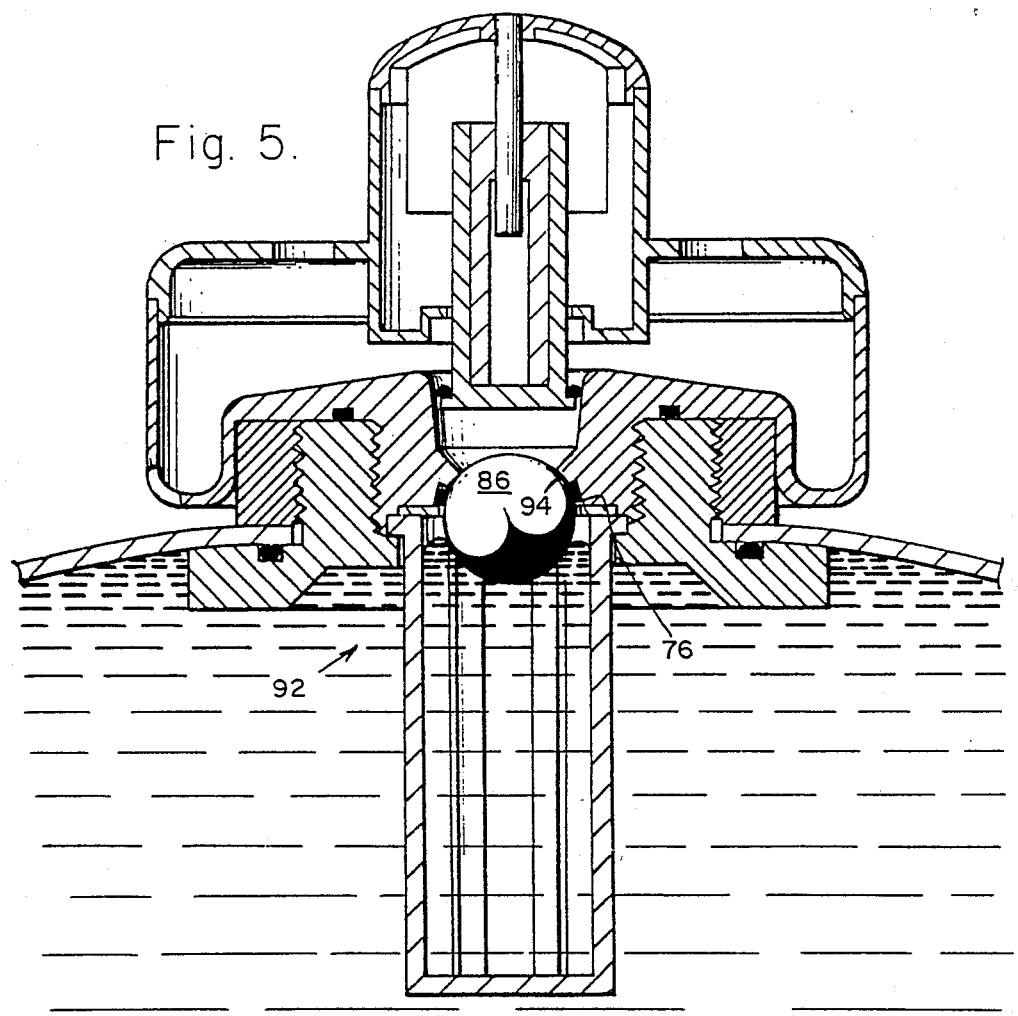
FIG. 5 is a view similar to FIG. 2, indicating operation of the valve assembly after water has filled the tank.
Figure 6:
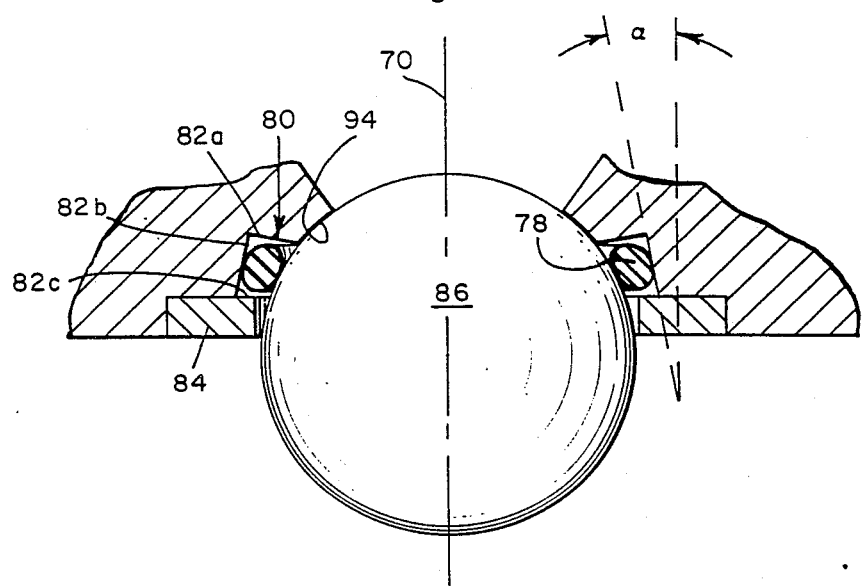
FIG. 6 is an elevation cross-sectional view of a fragment of the lower valve of FIG. 5, showing the lower valve seat improvement in enlarged detail.

Referring to FIG. 6 as well as to FIGS. 3 and 5, seating and unseating of the ball 86 in the O-ring seat 76 are enhanced by the inclination of the second wall 82b of the O-ring seat channel 80 and the freedom of movement of the O-ring 78 within the channel 80. The second channel wall 82b is inclined at an angle $\alpha$ from vertical, inwardly toward the vertical axis 70 of the passageway 28, so that the second wall 82b is a portion of a conical surface having a diameter decreasing toward the passageway 28. The angle $\alpha$ is sufficiently small to permit rolling of the O-ring 78 about itself when the buoyant ball 86 is pressed against the O-ring 78 by a force derived from the pressure of the water within the tank 10, but should not be so great as to preclude the O-ring 78 from creating an effective seal. One example of a suitable angle $\alpha$ is 15°, although other values of the angle $\alpha$ meeting the above qualifications would also be suitable.

When in an unstressed condition, the O-ring 78 is situated in contact with the conical channel wall 82b and the lower or third channel wall 82c which need not be perpendicular to the second wall 82b; the purpose of the third channel wall 82c is to retain the O-ring 78 in the channel 80 when in its relaxed state. As the ball 86 begins to press against the O-ring 78 from the force derived from the pressure of the water within the tank 10, the ball 86 begins to squeeze the O-ring and at the same time causes the O-ring 78 to start rolling along the conical surface 82b. The position of the first surface 82a is preferably sufficiently distant from the third surface 82c such that the O-ring 78 will not roll into the first surface 82a; i.e., the channel 80 is sufficiently wide along its conical wall 82b so that the O-ring 78 stops rolling before the wall 82a is contacted. The nominal diameter of the channel 80, the angle $\alpha$ and the characteristics of the O-ring 78 are preferably selected such that the expected force exerted by the ball 86 causes the O-ring 78 to rotate approximately one-eighth turn.

The rolling and wedging action of the O-ring 78 produces a sealing force greater than the force applied by the ball 86 derived from the water pressure from within the tank 10, thus increasing the reliability of the seal. The rolling action imposed on the seal also causes the O-ring 78 to act like an elastomeric spring which, as it unwinds (when water is being drained from the tank 10) decreases a .tendency for the ball 86 to be retained by the seat 76 by coercing the ball 78 off the seat 76. If the O-ring 86 has not been forced to rotate more than 180°, the nearest stable position when it unwinds will be its starting position, i.e. the O-ring 78 will be in contact with the second and third walls 82b, 82c.

In order to assure proper sealing and unwinding operation of the O-ring seat 76, as well as to assure that the ball 86 does not contact or scrape against the ring 84, a stop 94 having a surface conforming to the ball 86 is provided immediately above the seat channel 80. When subjected to forces of sufficiently great magnitude, the ball 86 is in contact with the stop 94 which further acts as a spherical seat which may provide additional sealing, particularly if the valve body 26 is made of a plastic material.

In an example of a valve assembly 24 with an inclination angle $\alpha$ of approximately 15°, a valve ball having a 0.625 inch diameter was successfully used with a Parker No. 2-015 O-ring.

The valve assembly 24 includes a second or upper valve 96 which, in its preferred embodiment, includes a conical valve seat 98 within the passageway 28 and about the upper port 74, and a plunger-type valve member 100 (see FIG. 2). The plunger 100 is adapted for travel along the valve vertical axis 70 and carries an O-ring 102 about its bottom portion 104, the O-ring being retained by a lip 106. Referring to FIG. 4, the bottom portion 104 of the plunger 100 is normally received by the passageway 28, with the O-ring 102 in seating engagement with the upper valve conical seat 98. Since the plunger bottom portion 104 includes a continuous bottom surface 105 through which air cannot flow, this seating of the O-ring 102 closes the upper port 74. The plunger 100 is supported within the valve assembly 24 such that it may travel along the vertical axis 70 for opening or closing the second port 74. In the preferred embodiment, the plunger is supported for such vertical movement by means of a dowel pin 108 situated along the vertical axis 70 and attached by its upper end to a central boss 118 of a cap 124 included by the valve cover 34. The plunger 100 contains a central vertical bore 110 which slidably receives the pin 108, with a loose fit, permitting the plunger 100 to be guided along the vertical axis 70. The plunger 100 travels downwardly gravitationally by means of its own weight, and may be made heavier by inclusion of a weighted insert 112.

Figure 7A:
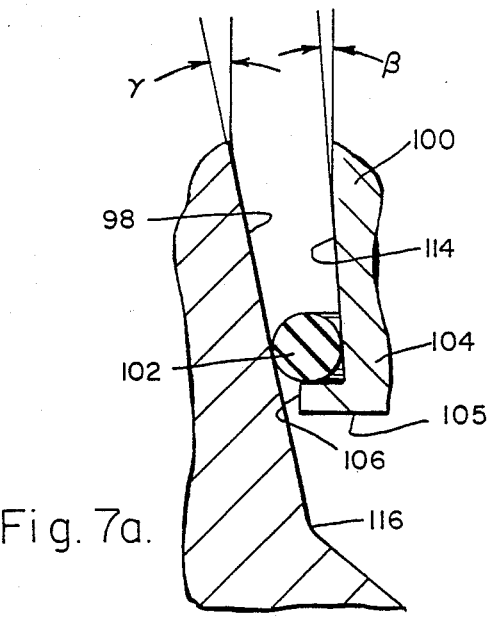
FIG. 7(a) is an elevation cross-sectional view of a fragment of the upper valve of FIG. 5, showing the upper valve seat improvement in enlarged detail.
Figure 7B:
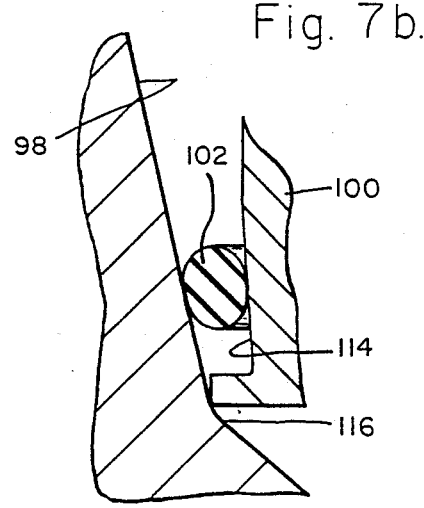
FIG. 7(b) is an elevation cross-sectional view of the fragment of FIG. 7(a), showing operation of the valve seat improvement in enlarged detail.

As best seen in FIG. 7(a), the bottom portion 104 of the plunger 100 has an exterior conical surface 114 extending upwardly and outwardly about the vertical axis 70, by an angle of inclination $\beta$, and the inner circumference of the O-ring 102 is in contact with the plunger conical surface 114. The interior conical passageway surface 98 extends upwardly and outwardly about the vertical axis 70, by an angle of inclination $\gamma$ which is equal to or greater than the angle of inclination $\beta$ of the plunger conical surface 114. When the plunger 100 is permitted to be gravitationally lowered into the passageway 28, an annular space is created between the two conical surfaces 98, 114 in which is disposed the O-ring 102, the outer circumference of the O-ring 102 being in contact with the passageway conical surface 98 to close (but not seal) the upper port 74. When the plunger 100 is further coerced downwardly—such as will occur by the vacuum within the tank 10 produced by the head or column of water in the tank 10 above the pool when the motor is shut off—the decrease of the annular space in the vicinity of the O-ring 102 as the plunger 100 descends causes the O-ring 102 to roll about itself upon the plunger conical surface 114 and the passageway conical surface 98, while being squeezed, as shown in FIG. 7(b). Such rolling and squeezing may continue until the downward movement of the plunger 100 stops upon contact of the lip 106 with a shelf or stop 116 in the passageway 28. The height of the plunger conical surface 114 is sufficient to assure that the O-ring 102 will not roll off the conical surface 114 (i.e. onto the cylindrical surface of the plunger 100) when the plunger 100 ceases its downward movement upon contact with the stop 116. The result is a tight seal between the plunger 100 and the passageway surface 98 for maintaining the upper port 74 closed. This rolling wedge seal feature of the present invention is particularly advantageous since the vacuum produced in the tank 10 may produce otherwise marginal clamping action (and hence an ineffective seal) in a conventional check valve.

The nominal diameters of the plunger 100 and valve seat 98, the angles $\beta$ and $\gamma$, and the characteristics of the O-ring 102 are selected such that the downward movement of the plunger 100 causes the O-ring 102 to rotate less than one-half turn, and preferably approximately three-eighths of a turn. In one example, the nominal diameter of the plunger 100 is 0.57 inch, the nominal diameter of the passageway surface 98 is 0.68 inch, is 2°, $\gamma$ is 4°, and the O-ring 102 is a Parker No. 2-015. In a variation of the preceding example where $\beta$ is equal to $\gamma$, the angles $\beta$ and $\gamma$ may be 3°.

Operation of the valve assembly 24, as well as other structural features thereof, will be described by reference to FIGS. 2, 4, 5 and 8. FIG. 4 shows the condition of the valve assembly 24 before an initial filling of the water tank 10 with water. The pump is not operating during this time, and the pressure of the air within the tank 10 is substantially the same as the pressure of the ambient air outside the tank 10. Under such "normal" conditions, the lower valve 92 is open, the buoyant ball 86 resting at the bottom of the support basket 62. Meanwhile, the upper valve 96 is closed, the plunger resting by its own weight with the O-ring 102 contacting the conical surfaces 102, 114, as shown more clearly in FIG. 7(a).

When the pump is turned on, the water entering the tank 10 must fill the tank 10 before recirculation to and from the swimming pool will occur. During the filling process, water displaces the air within the tank 10 and causes the air to flow upwardly through the lower port 72 and impinge upon the bottom surface 105 of the plunger 100 with sufficient pressure to lift the plunger 100, as shown in FIG. 2. The upward travel of the plunger 100 along the vertical axis 70 is limited by the O-ring 102 contacting an annular stop 120 extending from the cover 34. The air escapes from the tank 10, through the passageway 28 and the cover apertures 38. While air is flowing from the tank 10 in such manner, the upper valve 96 remains in its open condition.

When the filling of the tank has proceeded to the extent that water is entering the support basket 62 through the slots 88, continued filling causes the water to lift the buoyant ball 86 from the bottom of the basket 62 and, loosely guided by the guide surfaces 90, the ball 86 is forced into seating engagement with the lower valve seat 76. It should be noted that the inside diameter of the basket 72 is sufficiently greater than the diameter of the ball 86 to permit the ball 86 to freely float upwardly without being unduly constrained by the guide surfaces 90.

Because of the rapidity with which the ball 86 may be forced against the lower valve seat 76, a small amount of water may spurt from the passageway 28 through the upper port 74. This water is caught by the catch basin 30 and then drained through the drain hole 32. In order to protect the plunger 100 from any deleterious effects from this spurt of water, which may contain some diatomaceous earth if a diatomaceous earth filter is being used, the annular stop 120 extending from the cover 34 is configured such that the stop 120, together with the plunger lip 106, houses the upper valve O-ring 102 when the plunger 100 is in its uppermost position (as shown in FIG. 2), isolating the plunger 100 (except for its bottom surface 105) from the valve body 26. The O-ring 102 forms a seal with the stop 120, precluding water from entering the cap 124 and reaching the operative portions of the valve member 100.

While the upper valve 96 remains open, the plunger 100 is retained in a vertical position above the passageway upper port 74 by virtue of the inserted pin 108 and the plunger's loose insertion within the circular opening of the annular stop 120. The stop 120 determines the maximum distance of the plunger's bottom surface 105 above the passageway upper port 74. Accordingly, while the upper valve 96 is open, the plunger's bottom surface 105 and the O-ring 102 are retained in the vicinity of the upper port 74 and the upper valve seat 98.

When the tank 10 is full of water, the lower valve 92 is in a closed condition, as shown in FIG. 5. As water pressure increases by action of the pump, the ball 86 is coerced with greater force onto the lower valve seat 76. As determined by the magnitude of the force, the ball 86 may be stopped by the stop 94. Meanwhile, since the passageway lower port 72 has been closed to the flow of air or water from the tank 10, the upper valve plunger 100 falls into the valve body passageway 28, and the upper valve 96 regains its normally closed (although not sealed) condition.

Swimming pool filters ordinarily operate in accordance with a preselected cycle during each twenty-four hour period; for example, the filter pump may operate eight hours and be inoperative sixteen hours during each day. When the pump is turned off, the water pressure within the tank 10 returns to atmospheric and the ball 86 may become unseated from its valve seat 76. However, the closed upper valve prevents air from entering the tank 10 through the passageway 28. Any tendency for water to drain from the tank 10 will create a vacuum in the upper portion of the tank 10, causing the plunger to be coerced downwardly as previously described with respect to FIG. 7(b). As determined by the magnitude of the force, the downward travel of the plunger 100 may be stopped by the stop 116. Since air cannot enter the tank 10, the water within the tank will not drain into the swimming pool and the tank 10 will remain filled with water. This condition is shown in FIG. 7(b), and in FIG. 9 insofar as relevant here, it being understood that the variations between the embodiment shown in FIG. 9 and the embodiment shown in FIG. 5 are not pertinent to the present discussion.

In practice, on initial pump start-up a small amount of air is generally trapped in the tank 10 because of the rapidity with which the ball 86 may be forced against the valve seat 76. In addition, air remaining in the filter elements will be released with time into the upper portion of the tank 10, as will air released from solution in the water itself. With each successive pump turn-on cycle, however, more of the air is evacuated.

When it is desired to drain the water from the tank 10 (for example, so that the filter elements may be removed for cleaning), air must be admitted into the tank for displacing the water being drained. Turning to FIG. 8, which is a side elevation cross-sectional view of the valve assembly 24 as compared with the front elevation cross-sectional views shown in FIGS. 2, 4 and 5, it may be appreciated that the admission of air may be accomplished by manually lifting the plunger 100, and openings 122 for this purpose are provided in the cover cap portion 124 which supports the plunger 100 for vertical movement. To permit draining of the tank, an operator presses his fingers against the upper cylindrical surface of the plunger 100, through the openings 122, and pulls the plunger 100 upwardly until it makes contact with the stop 120. As the plunger is pulled upwardly, the O-ring 102 unwinds and is retained on the plunger 100 by the lip 106. While the plunger is held in this upward position, the upper valve 96 is maintained in its open condition and ambient air will enter the tank 10 through the aperture 38 and the passageway 28. When the operator releases the plunger 100 after the tank 10 has been drained, the plunger 100 falls to resume the normally closed condition of the upper valve 96.

Figure 9:
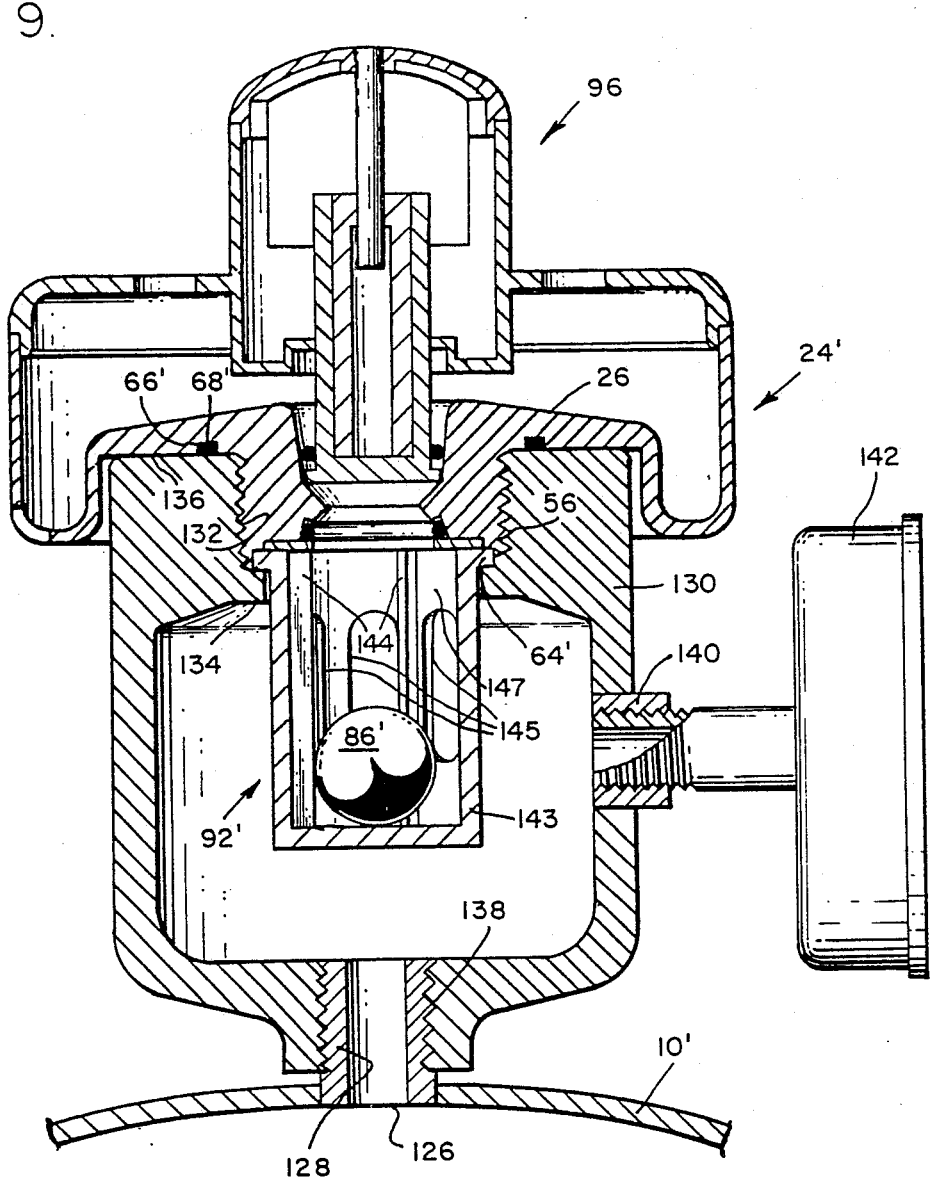
FIG. 9 is a front elevation cross-sectional view of a variation of the preferred embodiment of the valve assembly according to the present invention.

FIG. 9 shows a variation of the preferred embodiment of the present invention in which the lower valve 92 is removed from the inside of the tank 10 while communicating with the inside of the tank 10. This variation is particularly useful as a replacement for a manual air relief valve on an older filter tank 10' and may utilize an aperture 126 and nipple 128 existing in the filter tank 10'.

This valve assembly embodiment 24' includes a vessel 130 for containing the lower portion of the first valve 92, and the vessel 130 is attached to the valve body 26 by means of a threaded aperture 132 engaging the circumferential threads 56 of the valve body 26. The inside of the vessel 130 includes an annular shelf 134 onto which is mounted a support basket 143 by its annular ledge 64' engaging the mating lower surface of the valve body 26. A water-tight seal between the valve body 26 and the vessel 130 is provided by the downwardly facing O-ring 66' in annular channel 68' in contact with the upwardly facing annular surface 136 of the vessel 130.

The bottom of the vessel 130 includes a threaded aperture 138 in sealing engagement with the nipple 128. The vessel 130 may also include an internally threaded nipple 140 to which a pressure gage 142 may be connected.

The valve assembly 24' of FIG. 9 operates in substantially the same manner as the valve assembly 24 of FIG. 2, except as hereinafter discussed. The valve assembly 24' is situated above the tank 10', although in communication with the upper portion of the tank 10', so that the tank 10' will be full of water when the water enters the vessel 130 to cause the lower valve 92' to close. The water entering the vessel 130 is turbulent, and the ball 86' is required to be more constrained during its upward travel than in the embodiment shown in FIG. 2. Accordingly, the basket 143 of the embodiment of FIG. 9 includes guide rails 144, for guiding the ball 86' upwardly in a relatively constrained manner when water enters the vessel 130 and forces the ball 86' from the bottom of the basket 143. There is also an optimum size relationship between the maximum diameter of the ball 86' and the inside diameter of the vessel 130. One example of suitable dimensions is provided by a valve assembly 24' having a vessel 130 of approximately 2.16 inches inside diameter and a 0.625 inch diameter lower valve ball 86'.

The basket 143 is also shorter than the basket 62 of FIG. 2, and the length and location of the slots 145 of the basket 143 are of importance In the example given above, a suitable basket 143 included slots beginning at the mid-height of the ball 86' when the ball 86' is resting on the bottom of the basket 143, and ending approximately 0.20 inch below the lower surface of the shelf 134. The basket interior wall portion 147 between the top of the slots 145 and the bottom of the shelf 134 acts as a baffle. The water entering the vessel 130 from the tank 10' is thereby diverted under the ball 86', forcing the ball 86' upwardly and, guided by the guide rails 144, into seating engagement with the O-ring 78 for closing the lower valve 92'.

Figure 10:
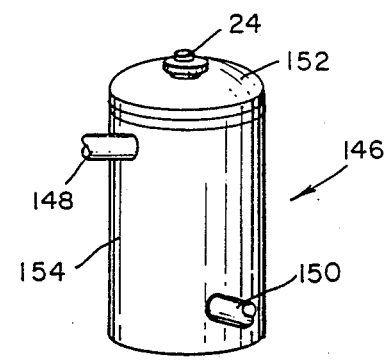
FIG. 10 is a perspective elevation view of a separation tank for use with a diatomaceous earth filter, shown with the valve assembly of the present invention in place.

Turning finally to FIG. 10, there is shown a separation tank 146 of a type which is often used with a diatomaceous earth filter tank. The separation tank normally does not communicate with the filter tank; however, when the filter tank is backwashed to remove dirty diatomaceous earth therefrom, the backwashed water from the filter tank is pumped through a separation tank inlet 148 and directed through a separation bag (not shown) within the separation tank 146 to remove the diatomaceous earth from the water. The clean water thereupon leaves the separation tank 146 through a water outlet 150 and is returned to the pool. During this procedure, air must be evacuated from the separation tank 146 as it fills with water, and the separation tank 146 must then be sealed to permit water circulation with the pool. When separation is completed and the pump is turned off, air must be introduced into the separation tank 146 to permit the water to drain therefrom, so that the cover 152 may be removed from the body 154 of the separation tank 146 for permitting removal of the filled separation tank bag. These valve functions, which are conventionally carried out by means of a manual air relief valve, may be automated by means of the dual valve assembly 24 of the present invention. Accordingly, the valve assembly 24 of the present invention is shown in FIG. 10, in combination with the separation tank 146 attached and functioning in the same manner as has been previously described with respect to the tank 10 of FIG. 1.

The various components of the valve assembly of the present invention may be of metal or plastic materials, and may be machined by conventional methods. It would appear advantageous, from considerations of economy as well as corrosion resistance, however, to manufacture the various components from a plastic material such as polypropylene or ABS, by such techniques as injection molding; subject to certain exceptions, such as the dowel pin 108 and the plunger weighted insert 112, which may be machined of a non-corrosive metal such as stainless steel. The O-rings may be of conventional type, e.g. of rubber or synthetic rubber.

Other embodiments of the present invention, and other modifications and variations of the embodiment and variation presented, may be developed without departing from the essential characteristics thereof. Although the preferred embodiment has been described in a swimming pool environment, the present invention may find applicability in other environments and in combination with tanks for holding liquids other than water and in atmospheres of gases other than air. Accordingly, the invention should be limited only by the scope of the claims listed below.

We claim:

1. In a valve body having a passageway including a port, a valve seat for a valve member having a spherical surface, the valve seat comprising in combination:
   an annular channel in the valve body and about the port, said annular channel including an inclined wall describing a conical surface having a diameter decreasing toward the passageway, said inclined wall terminating at a channel wall adjacent said inclined wall; and
   an O-ring having an inside diameter smaller than the diameter of the valve member spherical surface, said O-ring situated in said annular channel and in contact with said inclined wall such that said O-ring may roll upon and wedge against said inclined wall when the valve member spherical surface is forced against said O-ring toward the passageway and wherein said O-ring stops rolling before contacting said channel wall adjacent said inclined wall for providing a seal between said valve seat and said valve member.

2. The valve seat according to claim 1, above, further including stop means for stopping movement of the valve member toward the passageway after the valve member spherical surface is forced against said O-ring.

3. The valve seat according to claim 1, above, wherein said channel in the valve body is described by two valve body components,
   said first component including said inclined wall, and said adjacent wall having an inwardly extending surface, and
   said second component comprising a ring including an inwardly extending surface, said ring being secured to said first component such that said ring inwardly extending surface forms a third wall of said channel adjacent said inclined wall.

4. A valve comprising in combination:
   a valve body having a passageway and including a port;
   a valve member having a spherical surface;
   an annular channel in said valve body and about said port, said annular channel including an inclined wall describing a conical surface having a diameter decreasing toward said passageway, said inclined wall terminating at a channel wall adjacent said inclined wall;
   an O-ring having an inside diameter smaller than the diameter of the spherical surface of said valve member, said O-ring being in contact with said inclined wall for sealing said port when said spherical surface of said valve member is forced against said O-ring wherein said O-ring is caused to roll upon and wedge against said inclined wall without contacting said adjacent wall; and
   support means for supporting said valve member when said spherical surface of said valve member is not in contact with said O-ring.

5. The valve according to claim 4, above, wherein said valve member is a sphere.

6. The valve according to claim 4, above, wherein said valve member is a buoyant sphere, and further including a housing attached to said valve body such that said passageway communicates between the outside and the inside of said housing, said housing enclosing said support means and said valve member.

7. The valve according to claim 6, above wherein said housing comprises a tank to which said valve body is attached such that said port is situated at the top of said tank, said tank including means for filling said tank with liquid, whereby said buoyant sphere is lifted and forced against said O-ring when said tank becomes full of liquid.

8. The valve according to claim 6, above, wherein said housing includes means for admitting liquid thereinto.

9. The valve according to claim 8, above, wherein said means for admitting liquid is adapted for being coupled to the top of a tank having means for filling the tank with liquid, whereby liquid is admitted into said housing after the tank becomes full of liquid.

* * * * *